3,377,297
METHOD FOR PRODUCING POLYURETHANE FOAMS
James G. Hanlin, Akron, Ohio, assignor to The Goodyear Tire & Rubber Company, Akron, Ohio, a corporation of Ohio
Filed July 15, 1963, Ser. No. 294,992
3 Claims. (Cl. 260—2.5)

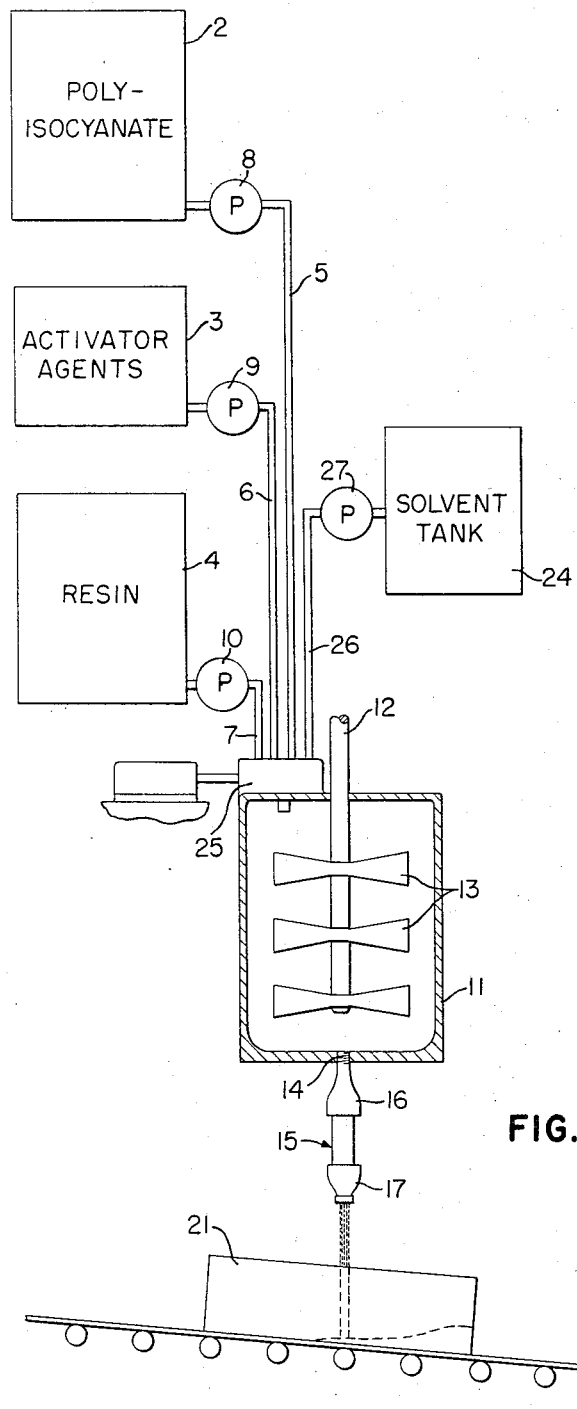
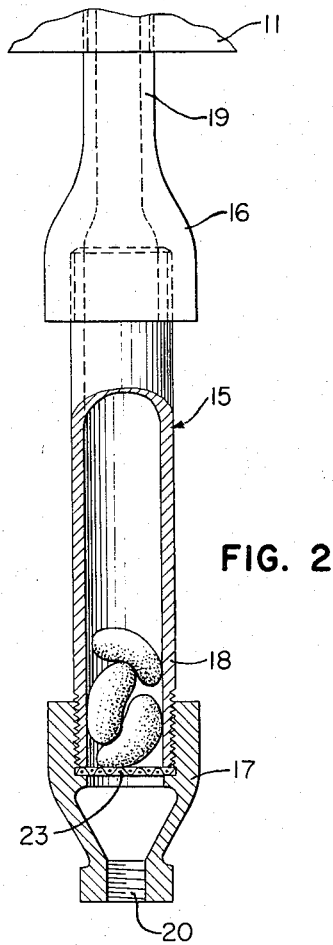
FIG. 1
FIG. 2
INVENTOR.
JAMES G. HANLIN
BY
J B Holden
ATTORNEY Patented Apr. 9, 1968

This invention relates to method and apparatus useful in the production of polyurethane foam products.

Although it has been known to produce polyurethane foam reaction mixtures by mixing the ingredients by hand in a paper cup, commercial practice is to use relatively high pressure mixing apparatus such as that described in U.S. Patents 2,948,925, 2,957,203, 2,990,252 and 2,990,380. Because the use of relatively high pressure in a mixing chamber produces a product which has less tendency to fissure and exhibits other desirable characteristics.

The principal object of this invention is to provide a method and apparatus for more uniformly mixing the polyurethane foaming reaction and provide for its distribution onto the foaming surface without loss of appreciable amounts of the foaming gas. Additional advantages and objects will be apparent from the drawings wherein FIG. 1 is a schematic view of a pressurized foaming apparatus and a conveyor for moving a foaming surface past the polyurethane foaming apparatus and FIG. 2 is an enlarged elevational view of an attachment for distributing the foaming mixture from the high pressure mixer onto the foaming surface.

Referring specifically to FIG. 1, numeral 2 represents an organic polyisocyanate storage tank; numeral 3 is the activator tank and numeral 4 is the resin tank. The storage containers 2, 3 and 4 are connected by suitable piping such as lines 5, 6 and 7 containing pumps 8, 9 and 10 to the polyurethane mixing head 11. The mixing head 11 preferably contains a motor driven agitator 12 having suitable pedals or projections 13 to facilitate the mixing of the polyisocyanate, activator and resins while maintaining them under a pressure within mixing head 11. The reaction mixture passes from the mixing head 11 through the orifice 14 into a pressure let-down device 15.

The nature of the pressure let-down device may be more clearly seen by reference to FIG. 2. The pressure let-down device preferably consists of two reducers 16 and 17 respectively connected together with a nipple 18 to give a device of the shape shown in FIG. 2. The hollow cavity formed by the assembly of the two reducers and the nipple is preferably filled with particulated inert substance such as gravel or Berl saddles, which rests on the baffle or open mesh flat member 23. The pressure let-down device of FIG. 2 has the end 19 screwed into the orifice 14 of the mixing head. Therefore the end 20 of the device of FIG. 2 becomes the outlet opening for distributing the polyurethane reaction mixture onto the foaming surface which in FIG. 1 is a rectangular box 21 resting on an incline conveyor 22.

In the operation of the foaming apparatus the polyisocyanate, activator and resin are pumped into the mixing head 11 under sufficient pressure and at a sufficient rate to develop a pressure within the mixing head in excess of atmospheric pressure and usually less than about 200 pounds per square inch with the preferred range being about .5 to about 60 pounds per square inch above atmospheric pressure. Normally the detrimental effect of relatively high pressure flashing or spattering is very evident at pressures of around 5 to 200 pounds per square inch for as the pressure in the mixing head goes above atmospheric pressure there is a strong tendency as the fluid reaction mixture is ejected from the mixing head for the carbon dioxide being generated as well as any auxiliary blowing gases (for example, the haloalkanes, alkanes and alkenes) to flash and thus be lost to the production of the foam product. By using a pressure reducing device applicant has discovered that the inherent tendency of the foaming agent such as carbon dioxide or other auxiliary blowing agent such as the lower boiling alkanes, haloalkanes, etc. to flash is utilized in further mixing the ingredients and also is entrained or entrapped within the foaming mixture whereby they are utilized in producing a foam material on the foaming surface of the mold 21. A further advantage obtained by use of this pressure reducer is that it prevents splashing and cavitation due to the impingement of a relative high pressure stream on the pouring surface.

Further objects and advantages of this invention will be readily apparent from the following working example:

Toluene diisocyanate was placed in tank 2. A mixture comprising 100 parts of polypropylene ether polyol of about 2000 to 3000 molecular weight, 0.15 part of triethylene diamine, 0.5 part of N-ethyl morpholine, 4 parts water and 2.5 parts of a commercial silicone which is a block copolymer containing ethylene and propylene radicals was placed in tank 4. As auxiliary agent a mixture comprising 0.15 part of stannous octoate and 2 to 12 parts of difluoro dichloro methane in sufficient polypropylene ether polyol to give a readily pumpable mixture, was placed in the auxiliary agent tank No. 3. Methylene chloride was placed in tank 24. Pumps 8, 9 and 10 were started to pump the ingredients in tanks 2, 3 and 4 into the mixer 11. When the synchronized valve 25 was actuated. The stirrer 12 was started prior to the time the ingredients were charged to the mixer 11. The polyurethane reaction mixture was formed in the mixer 11 at a pressure of about 10 pounds per square inch above atmospheric pressure and was allowed to flow into the pressure reducer 15 which was packed with silica particles having an average diameter of about one-fourth an inch to reduce the pressure on the reaction mixture to essentially atmospheric. From the pressure reducer 15 the liquid polyurethane reaction mixture was allowed to drop by gravity into mold 21 which was positioned at an incline angle of about 4 to 10° from the horizontal. When sufficient of the liquid polyurethane reaction mixture had been charged into the mold the valve 25 was actuated to close the ports communicating between mixer 11 and lines 5, 6 and 7. Mold 21 was moved from beneath the pressure reducer 15 at which time valve 25 was actuated to stop feeding of ingredients for liquid polyurethane mixture to the mixer and to open the port communicating between mixer 11 and line 26. With the port in valve 25 open to line 26, the methylene chloride from storage tank 24 was pumped into the mixing chamber 11 to flush out any liquid polyurethane reaction mixture remaining in the mixer and thus leave the mixer and pressure reducer 15 in a clean condition. Thus the pressure mixer was ready to pour a second mold upon the proper manipulation of valve 25 which would close the port communicating with line 26 and mixer 11 and open the ports between the mixer 11 and lines 5, 6 and 7.

The mold poured in accordance with the above procedure and cured at ambient to about 200° F. yields a polyurethane foam which is devoid of depression caused by the spattering from the polyurethane stream dropping into the mold and also appears to yield a foam having a higher degree of rise than one obtained where the pour is made at relatively high pressures.

To those skilled in the art it should be readily apparent that instead of polypropylene ether polyol, hydroxyl terminated polyester or polyester amides may be utilized in making polyurethane foams. The polyesters are made by esterification of dicarboxylic acids with glycols. For instance, polypropylene glycol of about 750 to 4000 molecular weight, polypropylene adipate of about 750 to 4000 molecular weight having an acid number less than about 5 and a hydroxyl number from about 20 to 150 may be utilized in making polyurethane foam. Broadly, the materials useful in making polyurethane foams are sometimes characterized as reactive hydrogen containing polymeric material as determined by the Zerewitinoff method and which have a molecular weight of about 550 to 4000.

Any of the organic polyisocyanates normally used in making polyurethane foam can be utilized with this invention. Representative of those utilized commercially are toluene diisocyanate, and the commercial diisocyanate and mixtures of the diisocyanate with higher functional isocyanates produced by the phosgenations of the reaction product obtained by reacting aldehydes with aromatic amine, for instance, formaldehyde with aniline.

The liquid polyurethane reaction mixture normally is formed by mixing the ingredients at ambient temperature, say around 75° F. but this does not mean temperatures of 50° F. or 100° F. cannot be used.

By inert particulated matter is meant those materials which do not dissolve or swell appreciably in the solvent and ingredients of the liquid polyurethane reaction mixture. Particles will usually be about ⅛ to ¾ inch in diameter but about ¼ to ½ inch are preferred.

While certain representative embodiments and details have been shown for the purpose of illustrating the invention, it will be apparent to those skilled in this art that various changes and modifications may be made therein without departing from the spirit or scope of the invention.

What is claimed is:
1. A method of producing polyurethane foam comprising the steps of
   (1) forming a liquid polyurethane reaction mixture comprising at least an organic polyisocyanate, a reactive hydrogen containing polymeric material having a molecular weight of about 550 to 4000 and water under a pressure of at least 0.5 to 200 pounds per square inch above atmospheric pressure;
   (2) flowing the liquid polyurethane reaction mixture into a hollow expansion chamber containing inert particulated matter therein to increase the travel of the liquid polyurethane reaction mixture between the inlet and outlet to said chamber and to thereby reduce the pressure on said mixture to essentially atmospheric, and then
   (3) allowing said polyurethane reaction mixture to flow onto a foam surface, and foam.

2. The method of claim 1 wherein the pressure in step (1) is about 5 to 200 pounds per square inch above atmospheric.

3. The method of claim 2 wherein the organic polyisocyanate is toluene diisocyanate and the reactive hydrogen containing polymeric material is essentially a polypropylene ether polyol.

References Cited
UNITED STATES PATENTS

| | | | |
|---|---|---|---|
| 3,169,119 | 2/1965 | Dankert et al. | 260—2.5 |
| 3,179,606 | 4/1965 | Prescott et al. | 260—2.5 |
| 3,169,751 | 2/1965 | Steele | 259—7 |
| 3,169,752 | 2/1965 | de Laubarede | 259—7 |
| 2,763,475 | 9/1956 | Dennis | 261—36 |
| 2,957,203 | 10/1960 | Marshall | 18—30 |
| 2,990,380 | 6/1961 | Auerbach | 260—2.5 |
| 3,012,977 | 12/1961 | Wilson | 260—2.5 |
| 3,108,976 | 10/1963 | Knox | 260—2.5 |
| 3,256,218 | 6/1966 | Knox | 260—2.5 |

OTHER REFERENCES

Chemical Engineers' Handbook, J. H. Perry, Editor, McGraw-Hill Book Co.

Chemical Engineering Progress, vol. 57, No. 10.

DONALD E. CZAJA, *Primary Examiner.*

LEON J. BERCOVITZ, *Examiner.*

F. McKELVEY, *Assistant Examiner.*